United States Patent [19]

Sawyer

[11] Patent Number: 5,794,140
[45] Date of Patent: Aug. 11, 1998

[54] METHOD AND APPARATUS FOR OFFERING SUBSCRIBERS ACCESS TO UNUSED COMMUNICATIONS CAPACITY IN A CELLULAR COMMUNICATIONS SYSTEM

[75] Inventor: Francois Sawyer, St-Hubert, Canada

[73] Assignee: Telefonaktiebolaget L M Ericcson (publ), Stockholm, Sweden

[21] Appl. No.: 547,549

[22] Filed: Oct. 24, 1995

[51] Int. Cl.$^6$ ............................................. H04Q 7/22
[52] U.S. Cl. ..................... 455/408; 455/453; 455/406
[58] Field of Search ............................ 379/58, 59, 63, 379/112, 114, 111, 115, 134, 137; 455/33.1, 54.1, 405, 406, 408, 423, 424, 422, 403, 560, 450, 453

[56] References Cited

U.S. PATENT DOCUMENTS

| | | | |
|---|---|---|---|
| 4,358,844 | 11/1982 | Pirani . | |
| 4,365,327 | 12/1982 | Pirani . | |
| 4,974,256 | 11/1990 | Cyr et al. | 379/59 |
| 5,218,618 | 6/1993 | Sagey . | |
| 5,303,297 | 4/1994 | Hillis . | |
| 5,450,471 | 9/1995 | Hanawa et al. | 379/58 |
| 5,487,174 | 1/1996 | Persson | 455/54.1 |
| 5,488,655 | 1/1996 | Hamlen | 379/114 |
| 5,517,555 | 5/1996 | Amadon et al. | 379/59 |
| 5,550,897 | 8/1996 | Seiderman | 379/59 |

FOREIGN PATENT DOCUMENTS

| | | |
|---|---|---|
| 0 526 118 A2 | 7/1991 | European Pat. Off. . |
| 2 272 607 | 11/1992 | United Kingdom . |

OTHER PUBLICATIONS

Baumgartner, Fred. "*Code Division Multiple Access, Beyond the Time Domain*", Reprinted from Communications Technology, Feb. 1990.

*Primary Examiner*—Curtis A. Kuntz
*Assistant Examiner*—William G. Trost
*Attorney, Agent, or Firm*—Jenkens &Gilchrist

[57] ABSTRACT

The load on the communications resources of a cellular telephone system is monitored to detect instances of excess amounts of unused resource capacity. When such instances are detected, a message is transmitted to subscribers via the cellular system offering reduced charging rates for calls initiated in response to the offering message. The subscriber mobile stations are programmed to alert the subscriber to the broadcast of the offering message, after which the subscriber may initiate a reduced rate call. The mobile stations may further be programmed to automatically initiate the cellular call in response to receipt of the offering message, and to thereafter engage in the communication. Monitoring of communications resources external to the cellular system is also made, and an offering message is broadcast by the system in response to detection of excess amounts of unused external resource capacity, in response to which subscribers may initiate calls requesting reduced rate access to the resource.

40 Claims, 4 Drawing Sheets

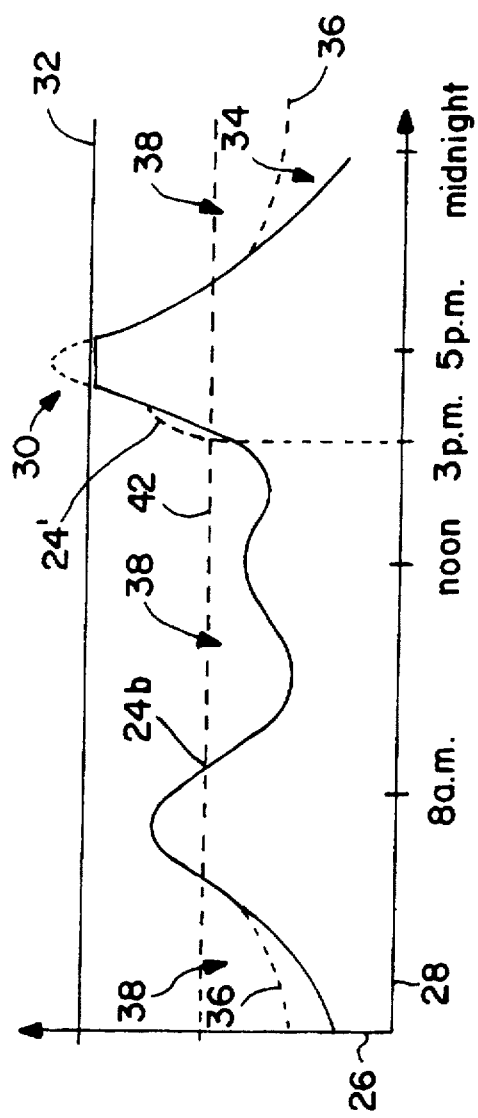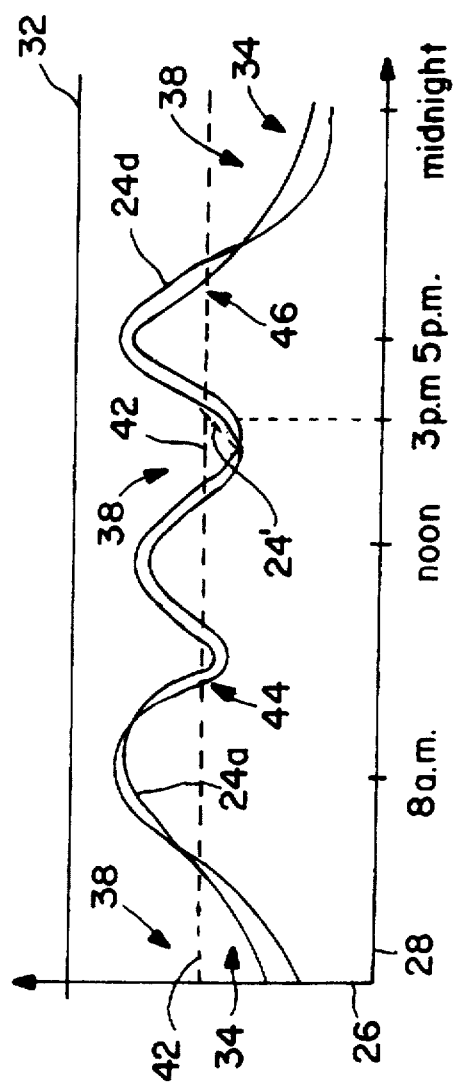

METHOD AND APPARATUS FOR OFFERING SUBSCRIBERS ACCESS TO UNUSED COMMUNICATIONS CAPACITY IN A CELLULAR COMMUNICATIONS SYSTEM

BACKGROUND OF THE INVENTION

Technical Field of the Invention

The present invention relates to cellular telephone systems and, in particular, to a method and apparatus for inviting subscribers in cellular telephone systems to utilize the system during periods of off-peak resource loading.

Description of Related Art

Capacity is a critical issue in providing cellular telephone services to subscribers. This capacity issue arises not only with respect to the air interface over which radio frequency communications are effectuated, but also with respect to all of the other resources utilized in or connected to the cellular system. Capacity, in view of subscriber demand for access to the cellular system and any external resources connected thereto, also drives the determination of the charging rate for the cellular service and/or the charging rate for use of the external resources.

It is therefore important for cellular system planners to provide adequate capacity to handle anticipated subscriber demand (i.e., system load) during peak usage times of the day (like rush hours and mid day). An unacceptable loss of revenue occurs when capacity fails to meet peak usage demand because it is at these times of the day that the charging rate for the service and the potential for revenue generation are at their highest levels. However, in designing the cellular system to have adequate capacity to handle peak demand, excess capacity exists and goes unused during certain off-peak usage times of the day (like nights and weekends, and also those momentary reduced loading instances experienced during peak usage times of the day). This is also unacceptable, because when the cellular system is not being used by subscribers, the unused system capacity is wasted and the cellular service provider does not generate as much revenue as is possible from the system.

Cellular service providers often charge higher rates during the week, especially during working hours, for cellular calls. Because of these higher rates, subscribers who would like to use the cellular system during working hours choose, for charging reasons alone, not to make cellular calls. This does not bother the service provider during peak usage times of the day because subscriber demand, even at the higher charging rate, often times nearly meets (or perhaps even exceeds) system capacity and hence nearly maximum revenue is being derived from the system. During off-peak usage times of the day, or in those momentary instances of reduced loading during peak use times of the day, however, the service provider would like to derive additional revenue from the unused system capacity, and accordingly would be very interested in enticing additional subscribers, and especially the cost conscious subscriber, to make use of the cellular system. There is accordingly a need for a system and method that offers cellular service subscribers an opportunity to utilize otherwise unused or inefficiently used cellular telephone system service capacity.

SUMMARY OF THE INVENTION

In accordance with the present invention, the communications load on a selected one or more of the resources of a cellular telephone system is monitored. When certain instances of excess amounts of unused resource capacity are detected, a message is transmitted to subscribers via the cellular network and their mobile stations offering reduced charging rates for calls initiated at the mobile station in response to the offering message. Subscribers may then advantageously utilize the system at a reduced calling rate.

In accordance with another aspect of the present invention, the mobile stations operating within the cellular telephone system function to provide a visual or aural indication to the subscriber concerning the receipt of the offering message. It is in response to this indication, that a cellular telephone call for purposes of either voice or data transmission at a reduced charging rate is initiated. Furthermore, the mobile stations in accordance with the present invention are subscriber programmable to operate by automatically responding to receipt of the offering message by instigating the subscriber desired cellular telephone call. In the case of a voice communication or a subscriber assisted data communication, the mobile station responds to receipt of the offering message and the automatic accessing of the cellular system by notifying the subscriber that call set-up is in progress. For non-subscriber assisted data communications, on the other hand, the subscriber desired data communication is performed automatically over the cellular telephone system in response to the receipt of the offering message. Furthermore, the present invention may also operate to send the offering message only when all of the monitored resources show excess amounts of unused capacity.

In a data application, the capacity of a data service node connected to the cellular system (for example, comprising a facsimile server or a database) may be of greater concern to the service provider than the capacity of the cellular telephone system or any of its included resources. In such instances, and further in accordance with yet another aspect of the present invention, the load on the data service node and/or its associated resources is monitored by the cellular system. When instances of excess amounts of unused data service node capacity are detected, a message is transmitted to subscribers via the cellular network and their mobile stations offering reduced charging rates for calls made from the mobile station to the data service node in response to the offering message. Alternatively, or in addition, a reduced charging rate for use of the data service node may be offered to the subscriber for cellular telephone system accesses made in response to the offering message. Furthermore, the present invention may also operate to send the offering message only when all of the monitored resources show excess amounts of unused capacity.

It is known that in some cellular systems, like a Code Division Multiple Access (CDMA) cellular system, the loading on the uplink channels of the air interface does not necessarily match the loading on the downlink channels. Accordingly, another aspect of the present invention comprises the monitoring by the cellular system of the different loading conditions on the uplink and downlink communications channels. When instances of excess amounts of unused uplink channel capacity are detected, a message is transmitted to subscribers via the cellular network and their mobile stations offering reduced charging rates for use of the uplink communications channels (primarily for data applications) in response to the offering message. Measurement of instances of excess amounts of unused downlink channel capacity, on the other hand, results in the offering of reduced charging rates for use of downlink communications channels (primarily for data applications) in response to the offering message.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 2A is a graph illustrating an example of the loading experienced on a cellular telephone system air interface;

FIG. 2B is a graph illustrating an example of the loading experienced on another type of cellular telephone air interface;

DETAILED DESCRIPTION OF THE DRAWINGS

Figure 1:
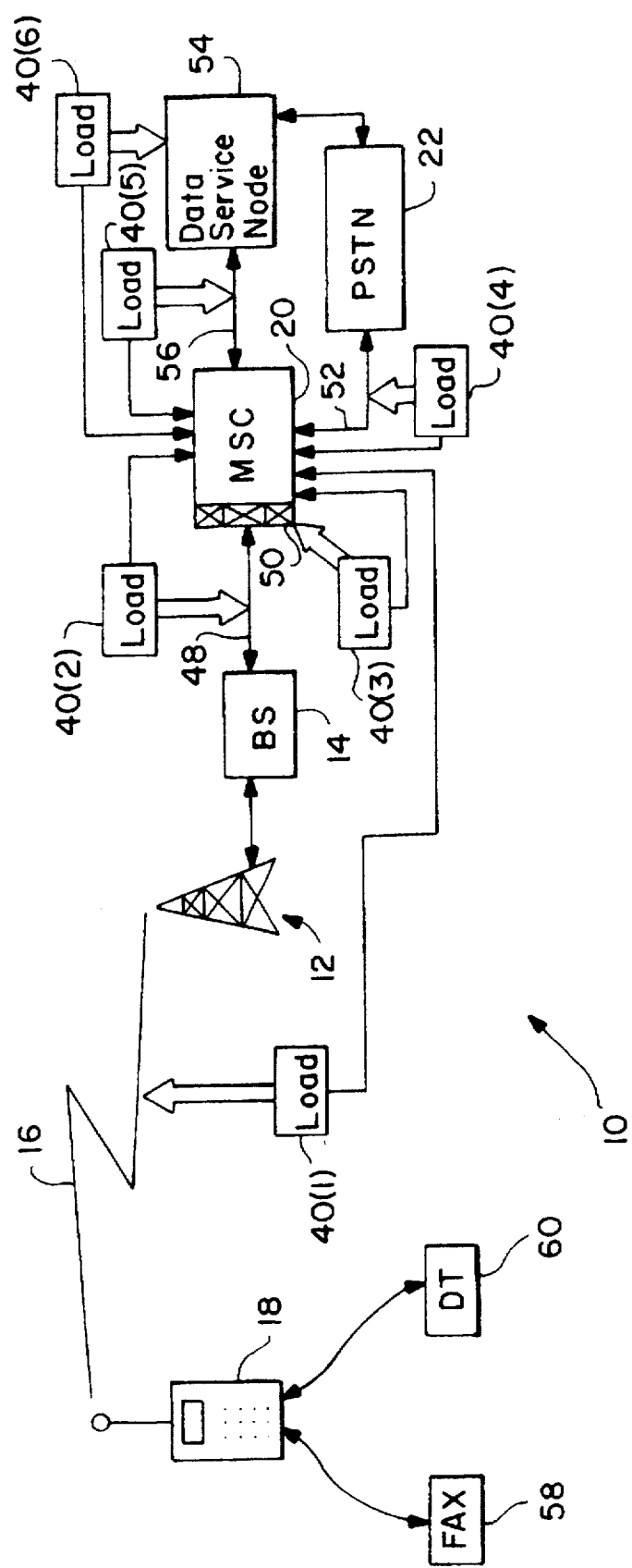
FIG. 1 is a block diagram of a cellular telephone system.

Reference is now made to FIG. 1 wherein there is illustrated a simplified block diagram of a cellular telephone system (AMPS, D-AMPS, GSM, CDMA or the like) 10 including a single cell site 12. It will, of course, be understood that such systems 10 typically include a plurality of cell sites 12, and that the depiction of a single cell site is to be taken as an illustration of, rather than a limitation on, the operation of the present invention. Each cell site 12 includes a base station (BS) 14 for effectuating bidirectional radio frequency communications over an air interface 16 with mobile stations 18 operating within the system 10. It will further be understood that cellular telephone systems like the system 10 typically include far more than one mobile station 18 operating within the system 10, or any one cell site 12 therein, at any one time, and that the depiction of only one mobile station is to be taken as an illustration of, rather than a limitation on, the operation of the present invention. Each base station 14 is connected to a mobile switching center (MSC) 20 that is connected to the public switched telephone network (PSTN) 22 or other telephone network (not shown). The mobile switching center 20 operates to control base station 14 operation, maintain a record of mobile station location within the system 10 and switch, with the public switched telephone network 22, those cellular telephone calls originated by or terminated at the mobile stations 18.

Referring now to FIGS. 2A and 2B, there are shown graphs illustrating the loading on the air interface 16 for one cell site 12 of the cellular telephone system 10 experienced during a typical day. For each of the graphs, the measured load 24 on the air interface 16 is plotted against the y-axis 26, while time during a single day is plotted against the x-axis 28. In FIG. 2A, the measured load 24$b$ is presented with respect to the air interface 16 in an Advanced Mobile Phone Service (AMPS), digital D-AMPS, Global System for Mobile (GSM) communications or the like cellular telephone system, wherein the measured loads on the uplink and downlink are the same. FIG. 2B, on the other hand, presents the measured loads 24$u$ and 24$d$ with respect to the uplink and downlink, respectively, of the air interface 16 in a code division multiple access (CDMA) or the like cellular telephone system, wherein the measured uplink and downlink loads are often times different. For example, in a data communication (like a facsimile transmission from the mobile station) in a CDMA system, a significant amount of bandwidth is used in the uplink direction to carry the subscriber message while a small amount of bandwidth is being used in the downlink direction for carrying system messages.

It will be noticed from a review of FIGS. 2A and 2B that the measured loads 24$b$, 24$u$ and 24$d$ vary considerably across the course of the day. During the rush hour time periods (for example, seven to nine in the morning and four to six in the afternoon), the measured load 24 is relatively high. In fact, in some instances, as generally indicated at 30, demand for cellular telephone service during these peak demand periods of time 30 may exceed the loading capacity 32 of the system, and thus all service subscribers who desire cellular telephone service at those times cannot be accommodated. It will be further noticed from a review of FIGS. 2A and 2B that the measured loads 24$b$, 24$u$ and 24$d$ during other times of the day (for example, evening, nighttime, mid-morning and mid-afternoon), as generally indicated at 34, are relatively low. During these off-peak demand periods of time 34, the system 10 possesses excess air interface capacity that is inefficiently going unused.

To address to some degree service provider concerns over the inefficient use of the air interface 16 during certain ones of the off-peak time periods of the day (and for that matter the week), like at nights and on weekends, cellular service providers offer special calling rate plans to subscribers. Calls made at night or during the weekend pursuant to the plan are charged at a substantially reduced rate, and in some instances are nearly free. The provision of such special calling rate plans serves as an incentive to increase subscriber use of the cellular telephone system during the certain off-peak time periods, and causes a corresponding increase in the measured load 24 on the air interface 16, as generally indicated at 36. However, even with subscribers taking advantage of any special plan, it will be noticed in FIGS. 2A and 2B that there still exists a substantial amount of unused capacity, as generally indicated at 38, on the air interface 16. Furthermore, such plans do nothing to address momentary reductions in load experienced during otherwise peak usage times of the day.

Reference is now again made to FIG. 1. The cellular telephone system 10 further includes a plurality of devices 40 for measuring various loads on the system and its included components. One such device 40(1) is located within or attached to the mobile switching center 20 and functions to measure the load 24 (see, FIGS. 2A and 2B) on the physical channels of the air interface 16. For example, in an AMPS type cellular telephone system, the device 40(1) determines for each cell site 12 the number of radio frequency carriers of the air interface 16 currently being used for subscriber cellular communications. Similarly, in a digital D-AMPS or GSM communications type cellular telephone system, the device 40(1) monitors the number of time slots being used in each cell for subscriber cellular communications.

With reference now again being made to FIGS. 2A and 2B, if the load 24 measured by the device 40(1) with respect to the physical channels being used on the air interface 16 over a given period of time is less than a predetermined threshold load 42, the cellular system 10 generates and transmits to all proximately located mobile stations 18 a message offering subscribers use of the air interface at a reduced charging rate in comparison to the rate currently in effect at that time of the day. This offering message is broadcast in an effort to invite the mobile stations and their owning subscribers within cell site 12 to make use of the cellular system 10 at that particular instance of off-peak demand. For example, assume that the device 40(1) measured load 24 on the air interface 16 at three o'clock in the afternoon is, as shown in FIGS. 2A and 2B, less than the threshold load 42. The offering message is then generated and broadcast to the proximate mobile stations 18. Responsive to receipt of the offering message, a number of mobile stations 18 initiate cellular calls causing an increase in the measured load (shown by broken line 24') and resulting in the generation of additional revenue to the service provider. If the increased measured load 24' rises above the threshold load 42, broadcast of the offering message is terminated, and is not re-broadcast until the measured load 24 or 24' again falls below the threshold.

In order to take advantage of the reduced charging rate offered by the cellular system during instances of off-peak demand, the mobile station 18 must transmit and the mobile switching center 20 must receive an indication in the call access request transmitted by the mobile station over the air interface 16 that the access request is being made specifically in response to the offering message. This prevents a subscriber from fortuitously instigating a cellular call during a time period of off-peak demand and thus advantageously gaining the benefit of the reduced charging rate when the subscriber would have otherwise been content to pay full rate for the call. It is possible for the loading situation to change before the call is instigated. The indication sent by the mobile station is thus important also because it functions as a request for access at the reduced rate. If the loading condition has changed, the subscriber may be denied access in response to system receipt of the indication.

In an analog cellular telephone system, such as the well known AMPS system, the offering message is preferably transmitted over the analog control channel. In a digital cellular telephone system, such as the well known D-AMPS or GSM systems, the offering message is preferably transmitted over either the analog or digital control channel. In a CDMA system, such as the IS-95 CDMA system, the offering message is preferably transmitted over the paging channel. It will, of course, be understood that the offering message may be broadcast to mobile stations within the cellular system 10 using any convenient means or method, and the foregoing specifications comprise illustrations rather than limitations on the implementation of the present invention.

Referring now again to FIG. 1, the mobile stations 18 operable in accordance with the present invention are programmed to respond to a subscriber indication of a desire to take advantage of offered reduced charging rates by monitoring for receipt of the system 10 broadcast of the offering message. These mobile stations 18 further function in two operating modes. In a first mode of operation, responsive to receipt of the system broadcast offering message the mobile station 18 visually and/or aurally alerts the subscriber to the off-peak loading condition of the system 10 thus allowing the subscriber to thereafter initiate a cellular call and take advantage of the reduced charging rate. The mobile station 18, operating in accordance with its programming, automatically provides the indication, to be sent with the call access request to the mobile switching center 20, that the cellular call is being made in response to the offering message. The subscriber may thereafter engage in either a voice or data cellular communication to be charged at the reduced charging rate unless the system denies subscriber access (perhaps due to a change in loading conditions).

In the second mode of the operation, the mobile station 18 is configured by the subscriber to automatically initiate a cellular call in response to receipt of the next system 10 broadcast offering message. Again, along with the call access request, the mobile station 18 automatically provides the requisite indication to the mobile switching center 20 that the cellular call is being made in response to the offering message. Where the subscriber desires to participate in the voice or data communication, the mobile station 18 visually and/or aurally alerts the subscriber to the fact that call set-up is in progress. Alternatively, and with particular application to data communications, the mobile station 18 is programmable by the subscriber to automatically perform the data transfer comprising either a facsimile or data transmission from the mobile station or a facsimile or data transmission to the mobile station over the cellular telephone network 10.

The present invention is perhaps more useful in data applications than in voice applications. One reason for this is that cellular data transmissions are most often not time sensitive transmissions. As long as the data is sent or received at some time, it is irrelevant to the subscriber whether the transmission occurs now or an hour from now. Voice communications, on the other hand, are often very time sensitive. The call must be made now or never. The subscriber accordingly cannot wait, or perhaps is not patient enough to wait, for receipt of the offering message before initiating the cellular call.

Reference is now made in particular to FIG. 2B. In a CDMA or other like cellular telephone system, there may occur times during the course of the day where the measured load 24u on the uplink exceeds the threshold load 42 while at the same time the measured load 24d on the downlink is less than the threshold. One such instance of this occurrence is generally indicated at 44. It should be remembered that these load measurements are being made on a cell-by-cell basis. Responsive to device 40(1) measurement of a downlink load 24d less than the threshold load 42, the system 10 generates and transmits to all proximately located mobile stations 18 a message offering subscribers use of the downlink air interface 16 at a reduced charging rate in comparison to the rate currently in effect at that time of the day. This offering message is broadcast in an effort to invite the mobile stations and their owning subscribers to make use of the downlink portion of the CDMA cellular system 10 at that particular instance of off-peak downlink demand.

Similarly, there may occur times during the course of the day where the measured load 24d on the downlink exceeds the threshold load 42 while at the same time the measured load 24u on the uplink is less than the threshold. One such instance of this occurrence is generally indicated at 46. Responsive to device 40(1) measurement of an uplink load 24u less than the threshold load 42, the system 10 generates and transmits to all proximately located mobile stations 18 a message offering subscribers use of the uplink air interface 16 at a reduced charging rate in comparison to the rate currently in effect at that time of the day. This offering message is broadcast in an effort to invite the mobile stations and their owning subscribers to make use of the uplink portion of the CDMA cellular system 10 at that particular instance of off-peak uplink demand.

The offering of either uplink or downlink capacity on the air interface 16 does not necessarily authorize subscribers to engage in voice or data communications requiring use of both the uplink and downlink portions of the air interface (i.e., bi-directional subscriber communications). Rather, the broadcast of the offering message merely invites subscribers to instigate a call from a message receiving mobile station 16 and request reduced rate usage of the identified off-peak demand portion of the air interface 16 for the transmission of a uni-directional subscriber voice or data communication.

For example, responsive to device 40(1) measurement of an off-peak uplink load 24u condition, and further responsive to the uplink offering message, the receiving mobile station 18 initiates a cellular call and transmits a uni-directional subscriber communication over the uplink portion of the air interface 16. This communications may comprise a facsimile transmission, data transmission or a voice call made to an answering machine or auto-attendant. Likewise, responsive to device 40(1) measurement of an off-peak downlink load 24d condition and the receipt of the downlink offering message, the receiving mobile station 18 initiates a cellular call and receives a uni-directional subscriber communication over the downlink portion of the air interface 16. It will, of course, be understood that in instances where both the uplink load 24u and the downlink load 24d are below the threshold 42, the system 10 generates and transmits to all proximately located mobile stations 18 a message offering subscribers use of both the uplink and downlink air interface 16 at a reduced charging rate. Responsive thereto, the indication generated by the mobile station provides identification of whether use of the uplink, downlink or both portions of the air interface 16 is desired.

The air interface 16 does not comprise the only portion of the cellular system 10 that is subject to load constraints affecting system operation. In fact, there may be instances wherein the air interface 16 is in an off-peak loading condition but the offering message should not be broadcast to invite additional load because it is essential for efficient system 10 operation to control loading on other aspects of the system. The cellular system 10 may have been engineered with excess air interface 16 capacity, and thus in accordance with the foregoing implementation the offering message would be transmitted all the time, resulting in too many subscriber calls being made at the reduced charging rate, a loss of revenue to the service provider, and perhaps the overloading of another resource within or connected to the system. In such a situation, the determination on whether to transmit the offering message should be based on the measured loading of other resources (perhaps in combination with the air interface 16 determination) rather than on the measurement of air interface 16 loading alone.

Accordingly, the cellular telephone system 10 includes additional devices 40(2)–40(4) for making loading measurements on other system resources. For example, one such device 40(2) located within or attached to the mobile switching center 20 functions to measure the load on the communications link 48 resource extending between the mobile switching center and the base station 14. The loading measurements are made with respect to either or both the signaling portion and/or the subscriber communication portion of each of the links 48. In the event the loading condition detected by device 40(2) is less than a predetermined loading threshold, the system 10 generates and broadcasts the offering message to the subscriber mobile stations 18 inviting subscriber use of the cellular telephone system 10. This determination and broadcast are made independently of the current loading state of the air interface 16. A reduced charging rate is then applied by the system 10 to any calls that are initiated in response to the broadcast offering message.

Another such device 40(3) located within or attached to the mobile switching center 20 functions to measure the load in the interface 50 resource of the mobile switching center handling the communications over the communications link 48 extending between the mobile switching center and the base station 14. The loading measurements are made with respect to either or both the signaling portion or the subscriber communication portion of the interface 50. In the event the loading condition detected by device 40(3) is less than a predetermined loading threshold, the system 10 generates and broadcasts the offering message to the subscriber mobile stations 18 inviting subscriber use of the cellular telephone system 10. This determination and broadcast are made independently of the current loading state of either the air interface 16 or the communications link 48. A reduced charging rate is then applied by the system 10 to any calls that are initiated in response to the broadcast offering message.

Yet another such device 40(4) located within or attached to the mobile switching center 20 functions to measure the load on the communications link 52 resource extending between the mobile switching center and the public switched telephone network 22. The loading measurements are made with respect to either or both the signaling portion and/or the subscriber communication portion of the link 52. In the event the loading condition detected by device 40(4) is less than a predetermined loading threshold, the system 10 generates and broadcasts the offering message to the subscriber mobile stations 18 inviting use of the cellular telephone system 10. This determination and broadcast are made independently of the current loading state of either the air interface 16, the communications link 48 or the interface 50. A reduced charging rate is then applied by the system 10 to any calls that are initiated in response to the broadcast offering message.

Alternatively, the determination to broadcast the offering message by the system 10 may take into account the device 40 measured loading conditions on any one or more of the system resources, including the air interface 16, the communications link 48, the interface 50 and/or the communications link 52. It will, of course, be understood that one of the load measuring devices 40 may be included and connected to make loading measurements on any resource within the system 10 having a load constraint of interest to system operation (like the processor of the mobile switching center, for example). In the event the loading condition detected by any one or more of the devices 40 on the system resources, either singly or in combination with each other as selected by the service provider, is less than a predetermined loading threshold, the system 10 generates and broadcasts the offering message to the subscriber mobile stations 18 inviting use of the cellular telephone system 10. A reduced charging rate is then applied by the system 10 to any calls that are initiated in response to the broadcast offering message.

Load constraints affecting subscriber use of the cellular telephone system 10 may exist external to the system itself. For example, consider the existence of a data service node 54 connected to either the mobile switching center 20 or to the public switched telephone network 22. When connected directly to the mobile switching center 20, the data service node 54 may comprise a node on the telephone network (perhaps within the public switched telephone network 22 or within an integrated services digital network (ISDN)) that is maintained and provided by the telephone service provider. When connected to the telephone network 22, the data service node 54 may comprise a node on a local or wide area network (LAN or WAN) maintained and provided by a third party. The data service node 54 may still further comprise a stand-alone data management device connected to and accessible through either the mobile switching center 20 or the public switched telephone network 22.

The communication resources may also comprise a plurality of data service nodes 54 connected to the cellular telephone system. Only one such data service node 54 has been illustrated in FIG. 1 for simplicity purposes. The load measuring devices 40, as described above, can make loading measurements on such a plurality of service nodes 54. In the event the loading condition detected by any one or more of the devices 40 on the plurality of data service nodes 54 is less than a predetermined loading threshold, the system 10 generates and broadcasts the offering message to the subscriber mobile stations 18 indicating which of the data service nodes 54 is being offered at the reduced charging rate.

Additional devices 40(5)–40(6) for making loading measurements on the resources associated with the data service node 54 are included and connected to report to the cellular telephone system 10. For example, one such device 40(5) connected to the mobile switching center 20 functions to measure the load on the communication link 56 resource extending between the mobile switching center or the public switched telephone network 22 and the data service node 54. The loading measurements are made with respect to either or both the signaling portion or the subscriber communication portion of the link 56. In the event the loading condition detected by device 40(5) is less than a predetermined loading threshold, the system 10 generates and broadcasts the offering message to the subscriber mobile stations 18 inviting the subscribers to access and make use of the data service node 54 via the cellular telephone network 10. A reduced charging rate is then applied by the system 10 to any calls that are initiated in response to the broadcast offering message.

Another such device 40(6) connected to the mobile switching center 20 functions to measure any load constraints on the operation of the data service node 54 itself. For example, the device 40(6) may measure the ability (e.g., processor loading) of the data service node 54 to process and handle requests for data, or input or output data. In the event the loading condition detected by device 40(6) is less than a predetermined loading threshold, the system 10 generates and broadcasts the offering message to the subscriber mobile stations 18 inviting the subscribers to access and make use of the data service node 54 via the cellular telephone system 10. A reduced charging rate is then applied by the system 10 to any calls that are initiated in response to the broadcast offering message.

A more complete understanding of this aspect of the invention may be had by reference to a specific example wherein the data service node 54 comprises a database storing retrievable information of particular interest to a group of subscribers to the cellular telephone network 10. The database may accordingly store periodically updated real estate listings in a particular market and thus be of interest to real estate agents. An agent may desire an update of the current listings, but not necessarily need to receive the information immediately and may not want to pay full rate for either the cellular connection or for access to the database. In accordance with the present invention, a real estate agent may then program his or her cellular telephone to provide an alert when an offering message from the system 10 is broadcast, or alternatively to automatically respond to the broadcast offering message. In either case, a cellular call is made from the agent's mobile station 14 to the data service node 54 indicating that the call is in response to the offering message and thus should be charged at the reduced charging rate for either or both the cellular air time and the access to the database. Responsive to data service node 54 receipt of the call from the agent, the current listings stored in the database are downloaded over the cellular telephone system 10 to the agent via either a facsimile machine (FAX) 58 (using a facsimile message) or a data terminal (DT) 60 (via a data or e-mail communication) connected to the mobile station 14. It will, of course, be understood that the data communication may alternatively be made from the subscriber to the data service node 54 in response to the offering message in instances where the data stored or processed in the node needs to be updated by a transmission from the subscribers.

The offering message may further relate to particularizing the services provided by the system 10 which are to be offered at a reduced rate. For example, air interface load may be low while the load on one data service node is high. In this instance, the offering message invites subscriber use that does not require access to the loaded data service node, but would, however, use the under-utilized air interface.

Figure 3:
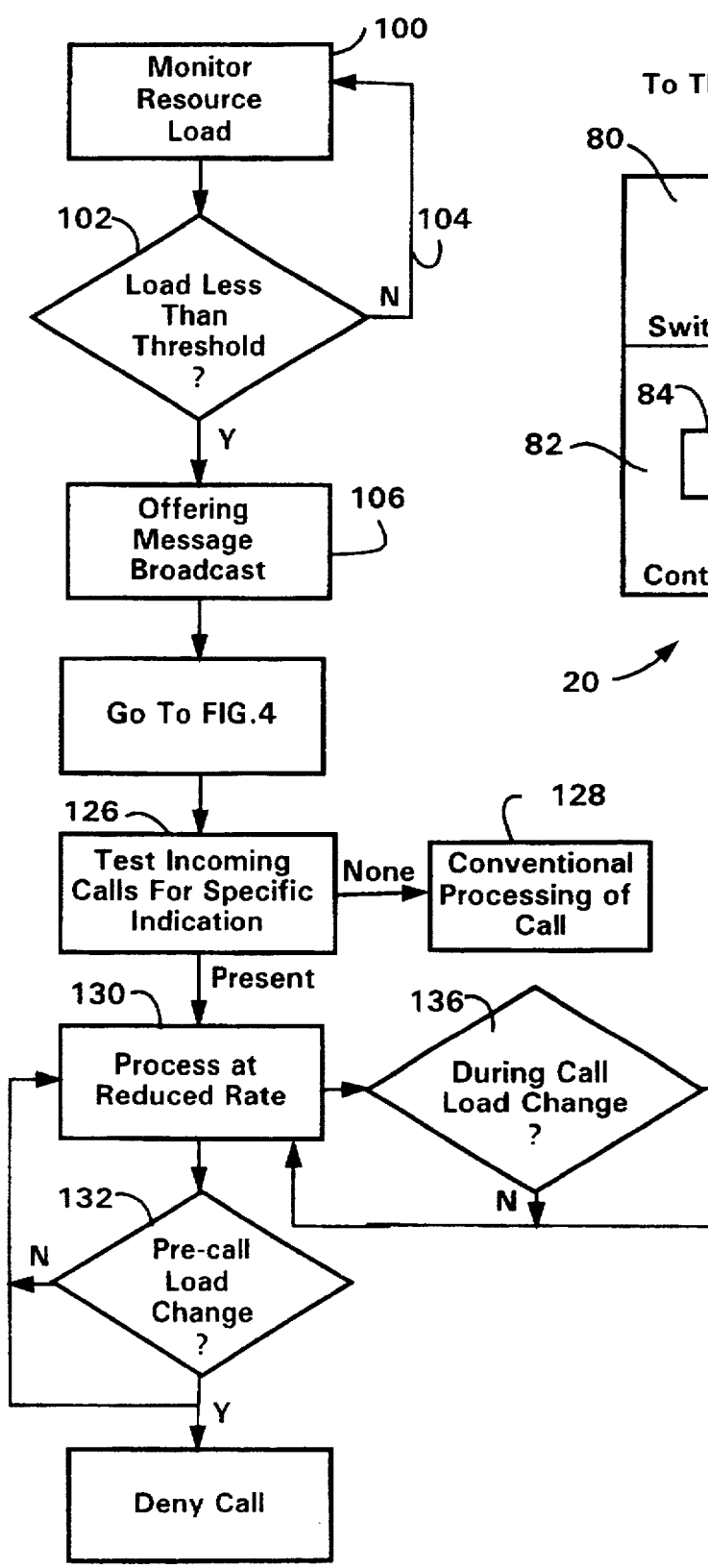
FIG. 3 is a flow diagram illustrating the operation of the present invention.
Figure 4:
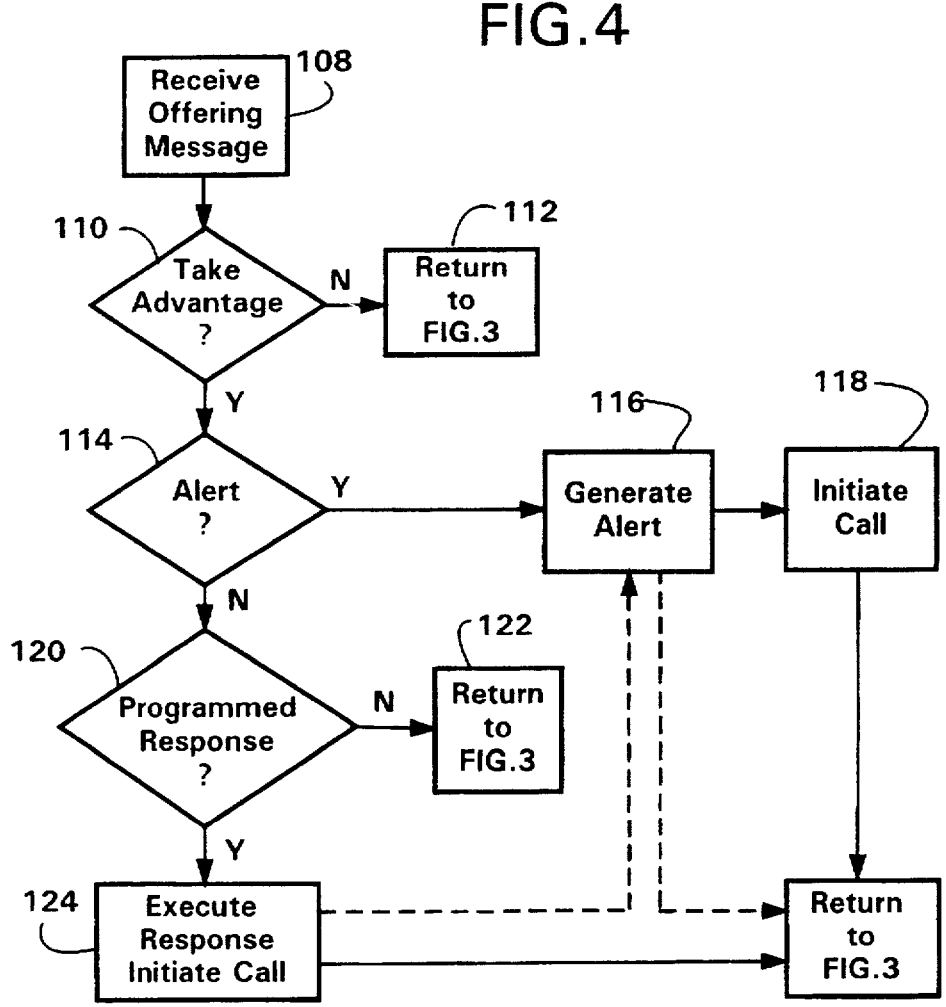
FIG. 4 is a flow diagram further illustrating the operation of the present invention.

Reference is now made to FIGS. 3 and 4 wherein there are shown flow diagrams illustrating the operation of the present invention. In general, the steps illustrated in FIG. 3 apply to the operation of the mobile switching center or other control unit within the cellular telephone system. The steps of FIG. 4, on the other hand, apply generally to the operation of the subscriber mobile stations within the cellular telephone system.

With reference now specifically to FIG. 3, in step 100, the cellular telephone system functions to monitor load on any of the internal and external resources of interest. As discussed above, such resources may comprise the cellular air interface, communications links, data service nodes, etc. A determination is next made in step 102 as to whether the measured load on any one resource or selected combination of resources is less than a predetermined load threshold. With respect to the air interface 16, this determination is made on a cell-by-cell basis. If the comparison of step 102 is answered in the negative, the process returns in step 104 to continue monitoring resource load. If the comparison is answered in the affirmative, a message is generated by the system and broadcast in step 106 over the cellular telephone system inviting subscribers to utilize the resource or resources at a reduced charging rate. In the case where the broadcast is based on air interface load measurements, the broadcast is made by the system only in the cell or cells where the measured load is less than the threshold.

Turning now to FIG. 4, at step 108 the broadcast offering message is received by a mobile station in the cellular telephone system. A determination is then made in step 110 as to whether the subscriber has indicated through programming of the mobile station a desire to take advantage of the reduced calling rates associated with the offering message. If the comparison of step 110 is answered in the negative, the process returns in step 112 to continue monitoring resource load. If the comparison is answered in the affirmative, a determination is made in step 114 as to whether the subscriber had programmed into the mobile station a request to be alerted to the broadcast of the offering message. If the subscriber desires to be alerted, a visual or aural alert is generated in step 116, in response to which, in step 118, the subscriber may initiate a cellular telephone call (voice or data) to take advantage of the reduced rates presented by the offering message.

If the comparison in step 114 is answered in the negative, a determination is made in step 120 as to whether the subscriber had programmed into the mobile station an automatic response to be made to a broadcast offering message. If not, the process returns in step 122 to continue monitoring resource load. If an automatic response has been programmed, the response, comprising in part a cellular telephone call (voice or data), is executed in step 124 to take advantage of the reduced rates presented by the offering message. Part of the executed response may include, as generally indicated by the broken flow path line, the generation of an alert in step 116 to allow the subscriber to actively participate in the call.

The cellular telephone calls initiated in steps 118 and 124 automatically include a mobile station generated specific indication that they are being made in response to the broadcast offering message. Referring again to FIG. 3, all incoming cellular telephone calls are tested in step 126 to determine whether they are being made in response to the offering message. If a call does not include the specific indication concerning being responsive to the offering message, the call is processed in step 128 in conventional fashion at the then-applicable charging rate for the call. On the other hand, a call received which includes the specific indication is processed in step 130 at the reduced charging rate offered in connection with the broadcast offering message. This processing step includes the evaluation of whether uplink, downlink or both bandwidth is being requested and is authorized by the offering message.

The processing of the call provided in step 130 further includes processing in step 132 to determine whether the off-peak demand load condition originally discovered in step 102 is still in effect at the time when the incoming subscriber cellular telephone call is received. If the loading condition remains under the threshold, the call continues to be processed in the manner set forth in step 130. If the measurement of the load on any one resource or selected combination of resources increases to exceed the predetermined load threshold, the system may either: (1) deny the subscriber the call in step 134; or, (2) continue handling the call in accordance with step 130 at the reduced charging rate.

The processing of the call provided in step 130 yet further includes optional processing in step 136 to determine whether the off-peak demand load condition originally discovered in step 102 continues as the call continues. If the loading condition remains under the threshold, the call continues to be processed in the manner set forth in step 130. If the measurement of the load on any one resource or selected combination of resources increases to exceed the predetermined load threshold, the subscriber may either: (1) continue to be charged at the reduced charging rate (step 130); (2) be notified in step 138 of the change after which the call is charged in step 128 in conventional fashion at the then-applicable charging rate for the call; or, (3) chose to terminate the call in step 140 and await the next instance of a broadcast offering message to continue with the call.

Figure 5:
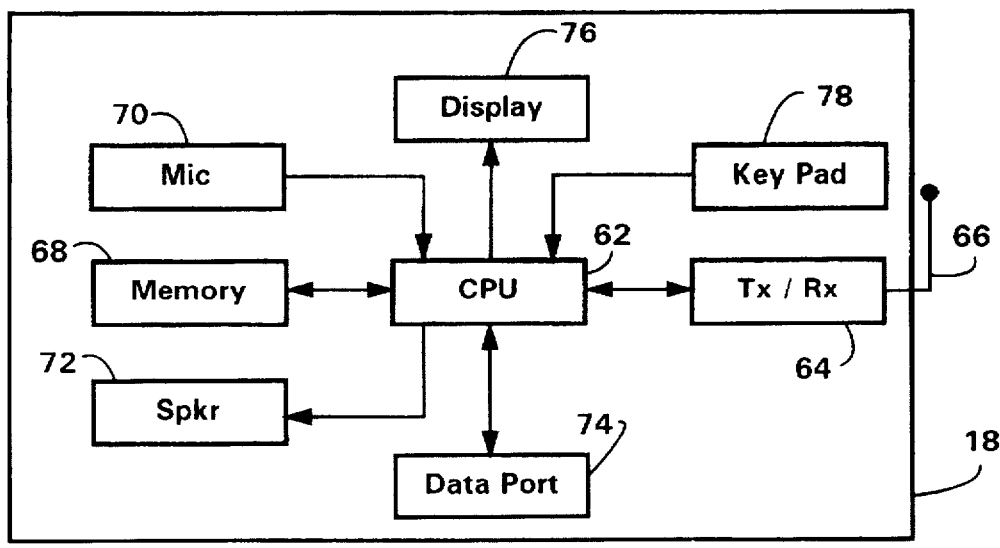
FIG. 5 is a simplified block diagram of a mobile station in accordance with the present invention.

Reference is now made to FIG. 5 wherein there is shown a simplified block diagram of a mobile station 18 in accordance with the present invention. The mobile station 18 includes a processor (CPU) 62 connected to a transceiver 64 operable on a number of different physical channels of the cellular telephone system. An output signal from the processor 62 selects the channel on which the transceiver 64 operates for communication over the air interface. An antenna 66 is connected to the transceiver 64 for transmitting and receiving radio communications (both voice and data) over the cellular communications system utilizing, for example, the base station 14 of FIG. 1. A data storage device 68 (preferably in the form of a read only memory—ROM—and a random access memory—RAM) is also connected to the processor 62. The data storage device 68 is used for storing programs and data executed by the processor 62 in controlling operation of the mobile station 18 to implement conventional mobile station operations and functions as well as those operations and functions required to take advantage of system broadcast offering messages as described herein and illustrated in FIG. 4. The mobile station 18 further includes a microphone 70 and a speaker 72 connected to the processor 62 for facilitating telephonic voice communications. It is via the speaker 72 that aural indication of the broadcast of the offering message is made to subscribers. A data port 74 is also included connected to the processor for facilitating telephonic data communications via a connection to a facsimile machine 58 or data terminal 60. Loading of mobile station 18 programming may be accomplished through the data port 74. A display panel 76 and a keypad 78 are also included in the mobile station and connected to the processor 62. It is via the display panel 76 that visual indication of the broadcast of the offering message is made to subscribers. Entry of mobile station 18 programming and operation commands may further be made through the keypad 78.

Figure 6:
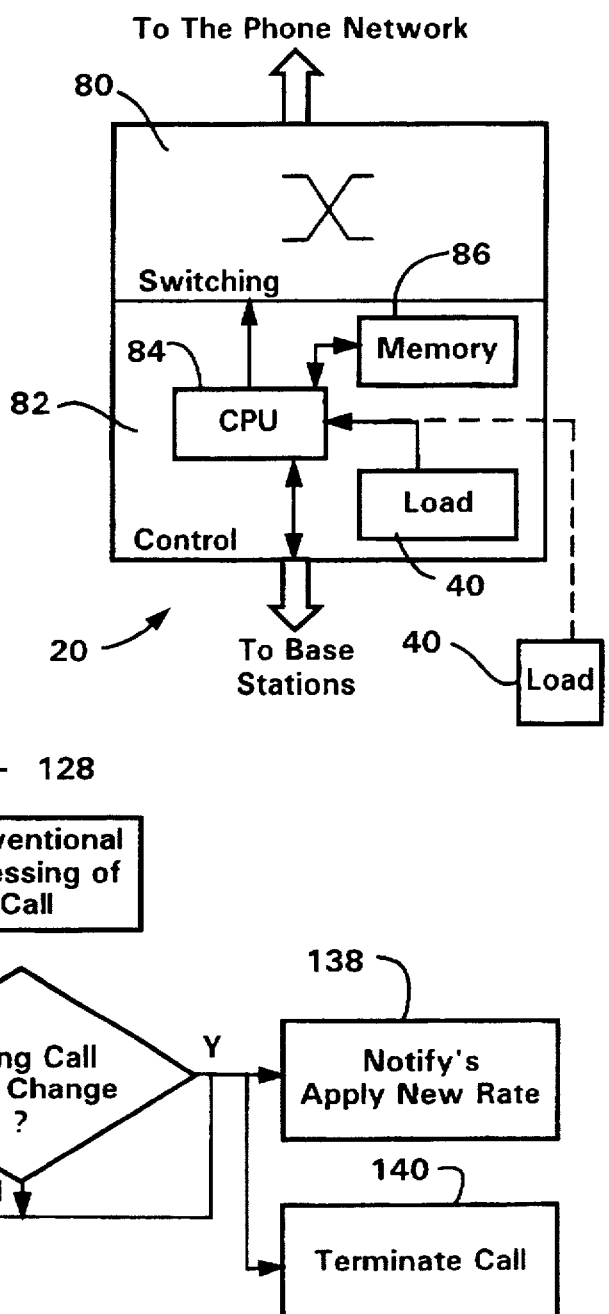
FIG. 6 is a simplified block diagram of a mobile switching center in accordance with the present invention.

Referring now to FIG. 6, there is shown a simplified block diagram of a mobile switching center 20 in accordance with the present invention. The mobile switching center 20 includes a switching section 80 and a control section 82. The switching section 80 includes the requisite functionality for switching telephone calls originated by or terminated at mobile stations operating within the cellular telephone network. The control section 82 incudes the functionality for controlling the operation of the switching section 80, and for controlling the operation of the base stations connected to the mobile switching center 20. A processor (CPU) 84 operating in accordance with a control program stored in a memory 86 effectuates control over mobile switching center 20 operation. One aspect of this control functionality comprises the processing of loading information received from load measuring devices 40 that may be included both internal and external to the mobile switching center 20. In response to this processing, as described above, an offering message is generated by the control section 20 and transmitted over the air interface to mobile stations offering the use at reduced rates of inefficiently used cellular telephone system resources and other external resources.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for inviting subscribers of a cellular telephone system to use inefficiently utilized communications resources, comprising the steps of:

measuring load on a selected internal or external cellular telephone system communications resource;

determining whether the measured load on the selected communications resource is less than a predetermined threshold;

responsive to an affirmative determination, broadcasting an offering message to cellular telephone system subscribers inviting use of the selected communications resource at a reduced charging rate;

granting subscribers who respond to the broadcast offering message access to the selected communications resource at the reduced charging rate; and denying a requesting subscriber access to the selected communications resource at the reduced charging rate

13 if a received subscriber request for access from the requesting subscriber does not include a specific indication that the subscriber request is responsive to the offering message.

2. The method as in claim 1 further including the step of engaging in a data communication over the selected communications resource.

3. The method as in claim 1 wherein the selected communications resource comprises an air interface of the cellular telephone system.

4. The method as in claim 3 wherein the air interface comprises a code division multiple access (CDMA) interface.

5. The method as in claim 3 wherein the air interface includes an uplink portion and a downlink portion and the step of measuring includes the step of separately measuring load on the uplink and downlink portions.

6. The method as in claim 5 wherein the step of determining comprises the step of independently comparing the uplink and downlink measured loads to the threshold, and wherein the step of broadcasting comprises the steps of:

broadcasting an uplink offering message to cellular telephone system subscribers inviting use of the uplink portion of the air interface at the reduced charging rate if uplink load is less than the threshold; and broadcasting a downlink offering message to cellular telephone system subscribers inviting use of the downlink portion of the air interface at the reduced charging rate if downlink load is less than the threshold.

7. The method as in claim 1 wherein the selected communications resource comprises a data service node connected to the cellular telephone system.

8. The method as in claim 1 further including the steps of:

measuring load on a plurality of data service nodes connected to the cellular telephone system;

determining whether the measured load on the plurality of data service nodes is less than a predetermined threshold;

responsive to an affirmative determination, broadcasting an offering message to cellular telephone system subscribers inviting use of the plurality of data service nodes at a reduced charging rate and indicating which of the data service nodes is being offered at the reduced rate; and granting subscribers who respond to the broadcast offering message access to the data service nodes at the reduced charging rate.

9. The method as in claim 1 further including the step of generating at the subscriber a response message to the offering message requesting set-up of a cellular telephone call, the response message including a specific indication that the response message is being sent in response to the offering message.

10. The method as in claim 9 further including the step of processing the response message upon receipt to confirm presence of the specific indication before granting access to the selected communications resource at the reduced charging rate.

11. The method as in claim 9 wherein the step of generating comprises the step of automatically generating the response message following receipt of the offering message.

12. A cellular communications system, comprising:

at least one load constrained communications resource;

means for measuring loading on the load constrained communications resource;

a control processing unit connected to receive measured loading values from the means for measuring, the processing unit operating;

14 to compare the measured loading values with a threshold;

responsive to the measured loading value being less than the threshold, generate a signal offering subscribers use of the load constrained communications resource;

responsive to a received subscriber access signal, granting a responding subscriber access to the load constrained communications resource at a reduced charging rate; and responsive to the received subscriber access signal, denying the subscriber access to the load constrained communications resource at the reduced charging rate if the subscriber access signal does not include a specific indication that the subscriber access signal is responsive to the offering signal; and radio frequency communications means connected to the control processing unit for broadcasting the offering signal to subscribers and for carrying the responsive subscriber access signal from the responding subscriber to the control processing unit.

13. The system of claim 12 wherein the load constrained communications resource comprises an air interface of the cellular communications system.

14. The system of claim 13 wherein the air interface comprises a code division multiple access (CDMA) interface.

15. The system of claim 13 wherein the air interface includes an uplink portion and a downlink portion, the means for measuring comprising means for independently measuring the uplink and downlink loading.

16. The system of claim 15 wherein the offering signal comprises an uplink offering signal if the uplink loading is less than the threshold and a downlink offering signal if the downlink is less than the threshold.

17. The system of claim 12 wherein the subscriber access signal is generated in response to receipt of the broadcast offering signal.

18. The system of claim 12 wherein the load constrained communications resource comprises a data service node connected to the cellular telephone system.

19. The system of claim 12 further comprising:

means for measuring load on a plurality of data service nodes connected to the cellular communication system; and the control processing unit further connected to receive measured loading values from the means for measuring load on the data service nodes, the processing unit operating to compare the measured loading values with a threshold, and responsive to the measured loading value being less than the threshold generate a signal offering subscribers use of the data service nodes and indicating which of the data service nodes is being offered, and further responsive to a received subscriber access signal granting a responding subscriber access to the data service nodes.

20. The system of claim 12 wherein the load constrained communications resource comprises a communications link within the cellular telephone system.

21. The system of claim 12 further including a subscriber mobile station including means for generating the subscriber access signal in response to the offering signal.

22. The system of claim 21 wherein the subscriber mobile station further includes means responsive to receipt of the broadcast offering signal for signaling an alert to the subscriber.

23. The system of claim 21 wherein the means for generating comprises means for automatically generating the subscriber access signal in response to receipt of the broadcast offering message.

24. The system of claim 21 wherein the subscriber mobile station further includes a data port for facilitating connection of a data communications device to the mobile station to engage in data communications using the accessed load constrained communications resource.

25. A method for inviting subscribers of a cellular telephone system to use inefficiently utilized communications resources, comprising the steps of:

measuring load on a selected internal or external cellular telephone system communications resource;

broadcasting an offering message to cellular telephone system subscribers inviting use of the selected communications resource at a reduced charging rate in the event the measured load is less than a predetermined threshold;

granting subscribers access to the selected communications resource at a rate other than the reduced charging rate if an access request does not specifically indicate that it is being made in response to the broadcast offering message;

granting subscribers who specifically indicate response to the broadcast offering message access to the selected communications resource at the reduced charging rate; and denying a requesting subscriber access to the selected communications resource at the reduced charging rate if the access request from the requesting subscriber does not include a specific indication that the access request is responsive to the offering message.

26. The method as in claim 25 wherein the cellular telephone system is a code division multiple access (CDMA) telephone system.

27. The method as in claim 25 further including the step of continuing to measure load following broadcast of the offering message.

28. The method as in claim 27 further including the step of denying subscribers who respond to the broadcast offering message access to the selected communications resource at the reduced charging rate if the measured load rises above the predetermined threshold prior to subscriber response.

29. The method as in claim 25 further including the step of continuing to measure load following subscriber access to the selected communications resource.

30. The method as in claim 29 further including the step of continuing to grant subscribers access to the selected communications resource at a rate other than the reduced charging rate if the measured load rises above the predetermined threshold during access.

31. The method as in claim 29 further including the step of terminating subscriber access to the selected communications resource if the measured load rises above the predetermined threshold during access.

32. A cellular communications system, comprising:

at least one load constrained communications resource;

a mobile switching center including:

means for measuring loading on the load constrained communications resource;

means for generating a resource offering message if the measured loading is less than a predetermined threshold; and means for processing subscriber requests for access to the load constrained communications resource by granting the subscriber access to the load constrained communications resource at a reduced charging rate in response to a received subscriber request for access, wherein the means for processing denies the subscriber access to the load constrained communications resource at the reduced charging rate if the received subscriber request for access does not include a specific indication concerning being responsive to the resource offering message; and a mobile station including means responsive to receipt of the resource offering message for generating the subscriber request for access processed by the mobile switching center.

33. The system as in claim 32 wherein the cellular telephone system comprises a code division multiple access (CDMA) telephone system.

34. The system of claim 32 wherein the load constrained communications resource comprises an air interface of the cellular telephone system over which communications between the mobile station and the mobile switching center are carried.

35. The system of claim 34 wherein the air interface includes an uplink portion and a downlink portion, and the means for measuring makes independent loading measurements on each portion.

36. The system of claim 35 wherein the resource offering message indicates which of the uplink or downlink portions, or both, have measured loading less than the predetermined threshold.

37. The system of claim 36 wherein the reduced charging rate is offered only on the uplink or downlink portions, or both, having measured loading less than the predetermined threshold.

38. The system of claim 32 wherein the mobile station further includes means for being programmed by the subscriber to automatically respond to receipt of the resource offering message by generating the subscriber request for access.

39. The system of claim 32 wherein the mobile station further includes means for alerting the subscriber to receipt of the resource offering message.

40. The system of claim 32 wherein the load constrained communications resource comprises a data service node connected to the cellular telephone system.

* * * * *